United States Patent
Kang et al.

(10) Patent No.: US 7,567,042 B2
(45) Date of Patent: Jul. 28, 2009

(54) REGENERATIVE BRAKING METHOD FOR VEHICLE HAVING ELECTRIC MOTOR

(75) Inventors: Hyoung Jin Kang, Seoul (KR); Man Bok Park, Seoul (KR)

(73) Assignee: Mando Corporation, Gyeonggi-do (KR)

( * ) Notice: Subject to any disclaimer, the term of this patent is extended or adjusted under 35 U.S.C. 154(b) by 344 days.

(21) Appl. No.: 11/525,340

(22) Filed: Sep. 21, 2006

(65) Prior Publication Data

US 2007/0126382 A1   Jun. 7, 2007

(30) Foreign Application Priority Data

Dec. 7, 2005 (KR) ................ 10-2005-0118533

(51) Int. Cl.
*H02K 7/10* (2006.01)
(52) U.S. Cl. ........................... 318/362; 318/375
(58) Field of Classification Search ............ 318/362, 318/375, 376, 432, 434
See application file for complete search history.

(56) References Cited

U.S. PATENT DOCUMENTS

| | | | | |
|---|---|---|---|---|
| 5,099,186 | A | * | 3/1992 | Rippel et al. ............ 318/803 |
| 5,362,135 | A | * | 11/1994 | Riddiford et al. .......... 303/3 |
| 5,632,534 | A | * | 5/1997 | Knechtges ............... 303/152 |
| 6,663,197 | B2 | * | 12/2003 | Joyce .................... 303/152 |
| 6,813,553 | B2 | * | 11/2004 | Nakamura et al. ......... 701/70 |

FOREIGN PATENT DOCUMENTS

| | | |
|---|---|---|
| JP | 5-213176 | 8/1993 |
| JP | 6-153312 | 5/1994 |
| JP | 9-216554 | 8/1997 |
| JP | 2002-67907 | 3/2002 |

* cited by examiner

*Primary Examiner*—Rina I Duda
(74) *Attorney, Agent, or Firm*—Ladas & Parry LLP

(57) ABSTRACT

A regenerative braking method for a vehicle having an electric motor. During an initial stage of a regenerative braking operation related to the vehicle having the electric motor, a flow rate of brake liquid as much as the amount of regenerative braking is delivered into a reservoir through opened exit valves of non-driving wheels, so as to generate a hydraulic braking force needed after subtracting the amount of regenerative braking from the amount of braking desired by a vehicle operator. When the amount of regenerative braking increases, exit valves of driving wheels are controlled to fulfill the total amount of braking desired by the vehicle operator. Also, when the amount of regenerative braking decreases, wheel pressures have to be increased to fulfill the vehicle operator's desire to brake. In the regenerative braking method for generating a residual amount of braking needed after subtracting the amount of regenerative braking, which corresponds to an amount generated by the electric motor, from the amount of braking desired by the vehicle operator, during the regenerative braking operation, based on a pressure difference between a pressure in the master cylinder and wheel pressures, entrance valves of the driving wheels are controlled to realize an operator's pedal feeling, and the exit valves of the driving wheels are controlled to allow the wheel pressures to follow a target pressure.

3 Claims, 4 Drawing Sheets ately, to a regenerative braking method for a vehicle having a regenerative braking function through the use of an electric motor, in which a hydraulic brake device can be controlled in consideration of a regenerative braking force.

REGENERATIVE BRAKING METHOD FOR VEHICLE HAVING ELECTRIC MOTOR

CROSS-REFERENCE TO RELATED APPLICATION

This application claims the benefit of Korean Patent Application No. 2005-0118533, filed on Dec. 7, 2005 in the Korean Intellectual Property Office, the disclosure of which is incorporated herein by reference.

BACKGROUND OF THE INVENTION

1. Field of the Invention

The present invention relates to a regenerative braking method for a vehicle having an electric motor, and, more particularly, to a regenerative braking method for a vehicle having a regenerative braking function through the use of an electric motor, in which a hydraulic brake device can be controlled in consideration of a regenerative braking force.

2. Description of the Related Art

Conventional engine powered vehicles have several problems in that they require numerous devices, such as for example, an engine, transmission, drive shaft, hydraulic brake, fuel supply device associated with the engine, intake and exhaust devices, cooling and lubricating devices, vibration-proof device, etc. Also, the engine powered vehicles tend to cause air pollution due to exhaust gas. To solve these problems, currently, vehicles having an electric motor, hydrogen vehicles, other next generation vehicles using a fuel cell or solar energy, and the like are being developed.

Recently, in particular, vehicles having an electric motor have been actively developed. The electric motor vehicles employ a regenerative braking method suitable for the improvement of fuel efficiency.

In the vehicles having an electric motor, if the electric motor is actuated by electric energy, driving wheels of the vehicle are rotated by the electric motor. Accordingly, how efficiently electric energy is used to actuate the electric motor becomes the major problem to be solved in the electric vehicles. For this, it is desirable that the electric motor functions as a generator to generate electric energy and store the generated electric energy in a condenser if a speed reduction or braking command is given by a vehicle operator. By the way, while the electric motor functions as the generator, vehicle wheels are subjected to a braking force, which is called a regenerative braking force. Consequently, the vehicle wheels are subjected to the sum of the regenerative braking force by the electric motor and a hydraulic braking force/frictional braking force by a hydraulic brake device.

The generation of electric energy by the electric motor is possible even during operation of a brake. Specifically, in the vehicle having an electric motor, the electric motor is able to generate electric energy from heat energy emitted during operation of a brake. In this case, the amount of electric energy obtainable by the electric motor is variable in accordance with the speed of the vehicle, the charge amount of a battery, and the like.

Accordingly, to fulfill the vehicle operator's desire to brake, i.e. to achieve the amount of braking desired by a vehicle operator corresponding to the sum of the regenerative braking force and hydraulic braking force, there must be produced only the hydraulic braking force needed after subtracting the regenerative braking force generated by the electric motor from the vehicle operator's desired braking force.

However, this may cause the vehicle operator to experience unfamiliar brake pedal feeling, and there exists a need for minimizing a bad effect thereby.

For this, differently from conventional brake systems, it is necessary to separate a master cylinder, which reflects the vehicle operator's desire to brake, from wheel cylinders. In other words, a pressure in the master cylinder affected by the vehicle operator's pedal press force should be controlled independently of a pressure in the wheel cylinders.

SUMMARY OF THE INVENTION

The present invention has been made in order to solve the above problems. It is an aspect of the invention to provide a regenerative braking method for vehicles having an electric motor, which can prevent the problem of over-braking during a regenerative braking operation and maintain the same brake pedal feeling as that of conventional vehicles.

Consistent with one aspect, an exemplary embodiment of the present invention provides a regenerative braking method for a vehicle having an electric motor comprising: the electric motor to convert a kinetic energy of the vehicle into an electric energy so as to brake the vehicle by regenerative braking; a reservoir to store brake oil therein; a master cylinder; normal open type entrance valves and normal close type exit valves provided at entrances and exits of respective wheel cylinders; a plurality of hydraulic pumps to pump the brake oil to the respective wheel cylinders; a motor to operate the plurality of hydraulic pumps; and opening/closing valves provided on hydraulic lines connecting the reservoir to suction sides of the respective hydraulic pumps, the regenerative braking method generating a residual amount of braking needed after subtracting the amount of regenerative braking, which corresponds to an amount generated by the electric motor, from a vehicle operator's desired braking amount, wherein, during a regenerative braking operation, based on a pressure difference between a pressure in the master cylinder and wheel pressures, the entrance valves of driving wheels are controlled to realize an operator's pedal feeling, and the exit valves of the driving wheels are controlled to allow the wheel pressures to follow a target pressure.

During an initial stage of the regenerative braking operation, a flow rate of the brake oil corresponding to the amount of regenerative braking by the electric motor may be discharged to the outside through the opened exit valves of non-driving wheels. When the amount of regenerative braking increases, the exit valves of the driving wheels may be controlled to fulfill the total amount of braking desired by a vehicle operator. Also, when the amount of regenerative braking decreases, the wheel pressures may be increased to fulfill the vehicle operator's desire to brake.

To raise a brake hydraulic pressure, the opening/closing valves provided on the hydraulic lines between the reservoir and the hydraulic pumps may be opened and the motor may be operated, to enable direct pumping of a required flow rate of the brake oil from the reservoir Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Figure 1:
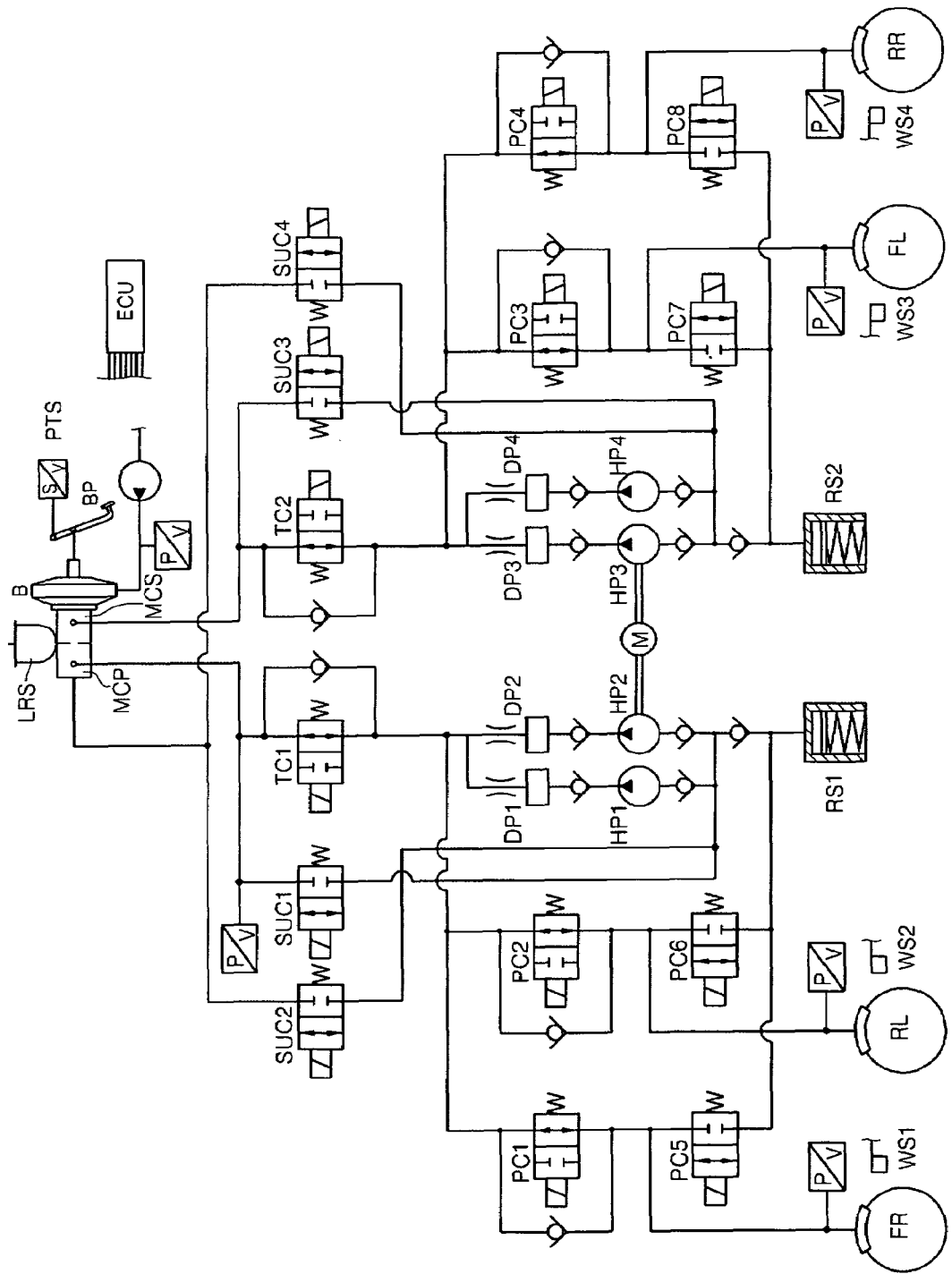
FIG. 1 is a diagram showing an electronically controlled hydraulic brake device consistent with the present invention.

Reference will now be made in detail to exemplary embodiments of the present invention, examples of which are illustrated in the accompanying drawings, wherein like reference numerals refer to like elements throughout. The embodiments are described below to explain the present invention by referring to the figures.

FIG. 1 is a diagram showing an electronically controlled hydraulic brake device consistent with the present invention. As shown in FIG. 1, the hydraulic brake device comprises a master cylinder MC to generate a brake pressure by operation of a booster B if a brake pedal BP is pressed.

The master cylinder MC includes two chambers MCP and MCS. A first one of the chambers MCP is used to control a brake hydraulic pressure to be transmitted from the master cylinder MC to wheel cylinders WFR and WRL that are installed, respectively, to a front right wheel FR and a rear left wheel RL. A normal open type cut valve TC1 is provided on a hydraulic line between the first chamber MCP and the wheel cylinders WFR and WRL. Also, normal open type entrance valves PC1 and PC2 are provided on hydraulic lines between the normal open type cut valve TC1 and the respective wheel cylinders WFR and WRL.

Normal close type exit valves PC5 and PC6 are provided at exit sides of the wheel cylinders WFR and WRL, respectively. Provided at exit sides of the normal close type exit valves PC5 and PC6 are a low-pressure accumulator RS1 that is used to temporarily store a brake liquid discharged from the respective wheel cylinders WFR and WRL, a pair of hydraulic pumps HP1 and HP2 that are used to pump the brake liquid stored in the low-pressure accumulator RS1 so as to forcibly return the brake liquid into the respective wheel cylinders WFR and WRL, and a single motor M connected to the hydraulic pumps HP1 and HP2.

Normal close type exit valves SUC1 and SUC3 are provided on auxiliary hydraulic lines between suction sides of the hydraulic pumps HP1 and HP2 and the first chamber MCP of the master cylinder MC. Also, normal close type exit valves SUC2 and SUC4 are provided on auxiliary hydraulic lines between suction sides of the hydraulic pumps HP1 and HP2 and a reservoir LRS. Accordingly, if the exit valves SUC1 and SUC3 are opened, the auxiliary hydraulic lines between the master cylinder MC and the hydraulic pumps HP1 and HP2 are opened. If the exit valves SUC1 and SUC3 are closed, the auxiliary hydraulic lines between the master cylinder MC and the hydraulic pumps HP1 and HP2 are closed. Meanwhile, if the exit valves SUC2 and SUC4 are opened, the auxiliary hydraulic lines between the reservoir LRS and the hydraulic pumps HP1 and HP2 are opened. If the exit valves SUC2 and SUC4 are closed, the auxiliary hydraulic lines between the reservoir LRS and the hydraulic pumps HP1 and HP2 are closed.

It will be appreciated that a hydraulic circuit related to a front left wheel FL and rear right wheel RR has the same constituent elements as those of the above described hydraulic circuit of the front right wheel FR and rear left wheel RL.

Here, reference numerals DP1 and DP2 denote high-pressure accumulators.

The cut valves TC1 and TC2, exit valves SUC1, SUC2, SUC3 and SUC4, and entrance valves PC1 to PC4 and exit valves PC5 to PC8 of the respective wheel cylinders WFR, WRL, WFL and WRR, and the motor M to operate the hydraulic pumps HP1, HP2, HP3 and HP4 shown in FIG. 1 are operated by an electronic control unit (ECU) performing a control mode, such as an electronic stability program (ESP) mode, etc.

The front left and right wheels FL and FR and rear left and right wheels RL and RR are provided with wheel speed sensors WS1 to WS4, respectively. The wheel speed sensors WS1 to WS4 are electrically connected to the ECU to send signals representing detected wheel speeds to the ECU.

The present invention provides a regenerative braking system, which is obtained by providing a hydraulic control device of a conventional ESP system with additional elements for achieving improved performance and efficient regenerative braking operation. That is, four pressure sensors for measuring wheel pressures in the respective wheel cylinders, and a single pressure sensor for measuring a pressure in the master cylinder are mounted to the regenerative braking system, thereby enabling more accurate control of the wheel pressures.

In the present invention, the regenerative braking system employs an additional hydraulic circuit for discharging the brake liquid as much as the amount of regenerative braking to the reservoir LRS and pumping a desired flow rate of the brake liquid from the reservoir as needed to increase a brake hydraulic pressure. The valves SUC2 and SUC4 are provided on the hydraulic circuit for controlling the flow rate of the brake liquid. The four hydraulic pumps HP1, HP2, HP3 and HP4 are connected to the electric motor to improve control errors and pedal feeling during an increase of the hydraulic pressure. Also, a pedal travel sensor (PTS) is attached to a location near the brake pedal BP to recognize a vehicle operator's desire to brake.

Figure 2:
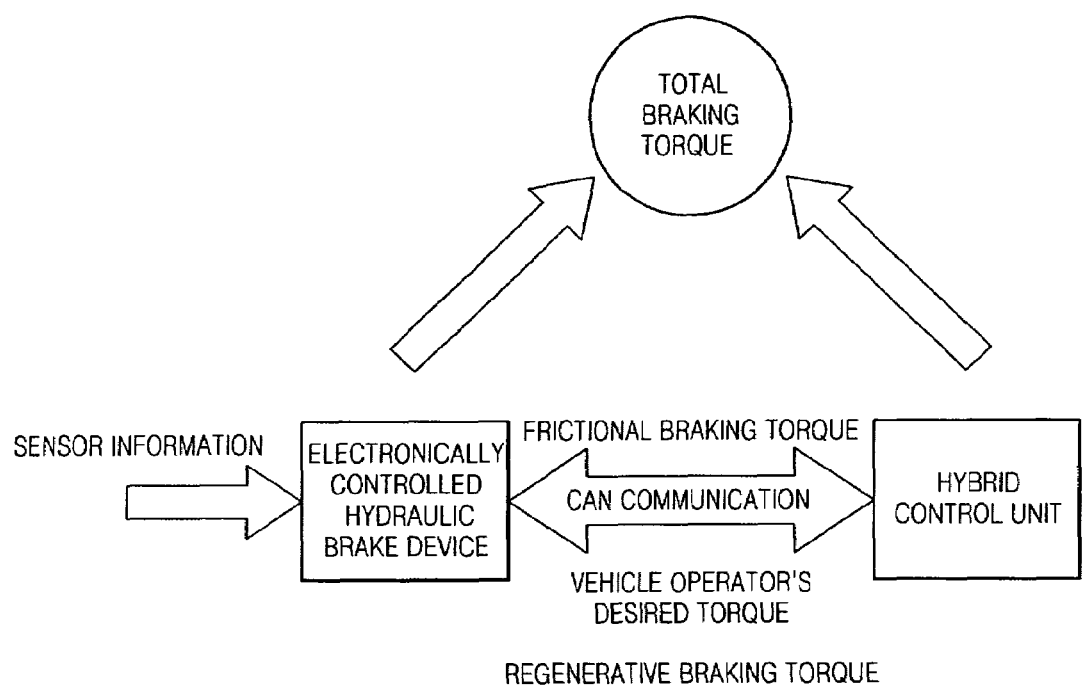
FIG. 2 is a simplified concept view showing a regenerative braking system consistent with the present invention.

FIG. 2 is a simplified concept view showing the regenerative braking system consistent with the present invention. As shown in FIG. 2, the electronically controlled hydraulic brake device is used to calculate the amount of braking desired by a vehicle operator. A hybrid control unit (HCU) is used to calculate a possible regenerative braking torque, to enable implementation of a regenerative braking operation. In this case, the electronically controlled hydraulic brake device controls a pressure in each wheel cylinder by regulating the amount of braking except for that corresponding to the regenerative braking torque by the electric motor. The electronically controlled hydraulic brake device and hybrid control unit interchange information required for their control operations through a CAN communication.

Figure 3:
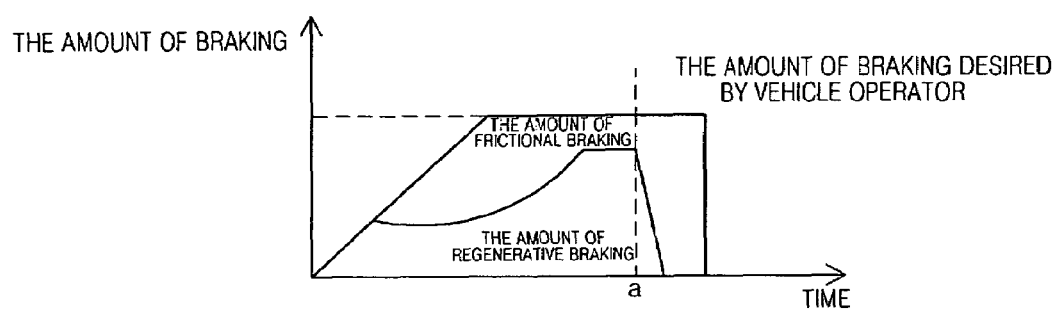
FIG. 3 is a graph showing a general example of a regenerative braking torque depending on the speed of an electric motor.

FIG. 3 is a graph showing a general example of a regenerative braking torque depending on the speed of the electric motor, and more particularly, showing a vehicle braking state. An abscissa of the graph represents a time under the assumption that the speed of a vehicle decreases. A regenerative braking torque has a characteristic in that it decreases the faster the vehicle speed and increases the slower the vehicle speed, and also, shows a rapid decrease at a predetermined low speed. Accordingly, it is necessary to decrease a hydraulic brake force in a section where the amount of regenerative braking increases, and to increase a hydraulic brake force in a section where the amount of regenerative braking decreases.

Figure 4:
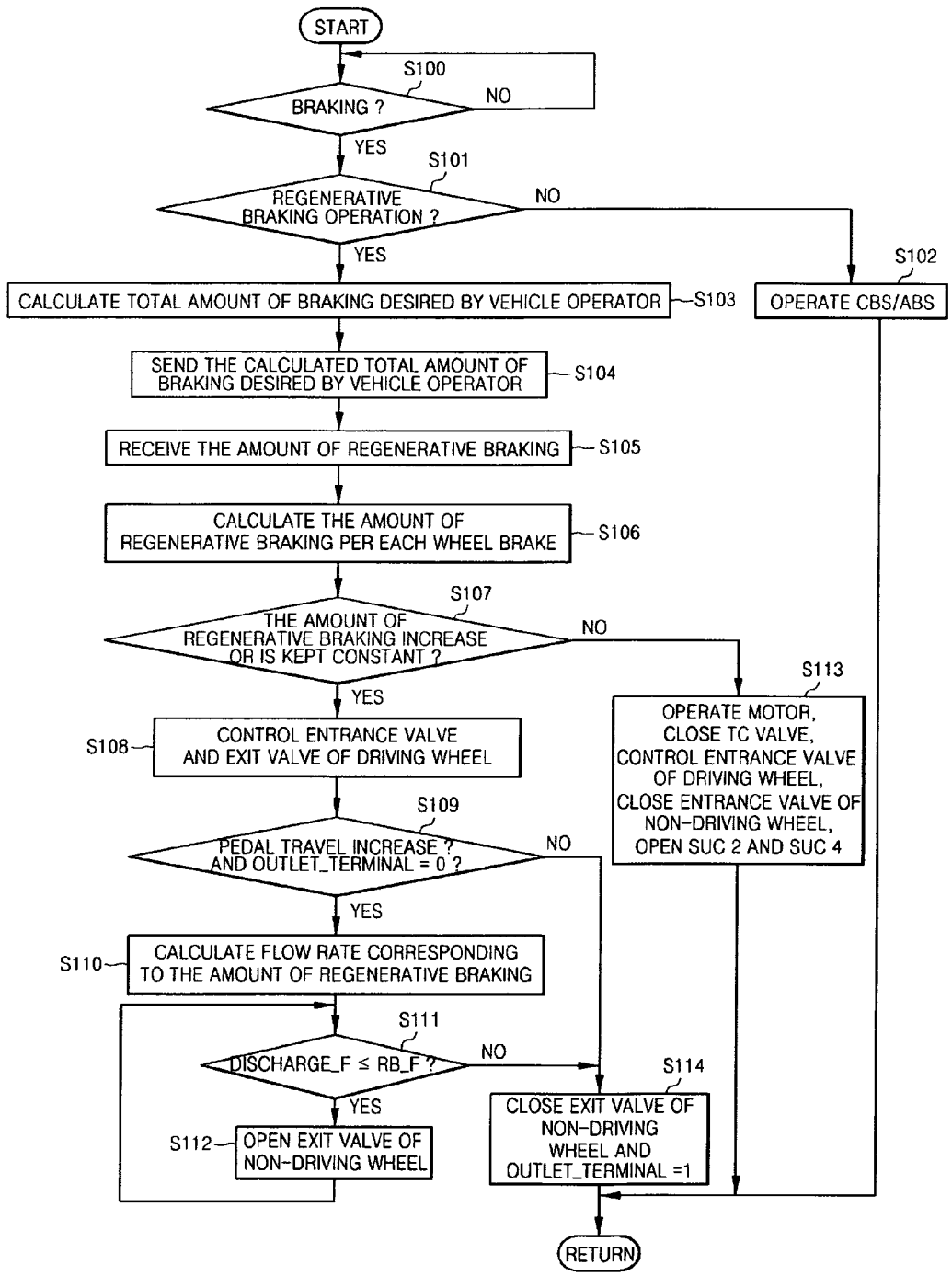
FIG. 4 is a control flow chart showing a regenerative braking method for a vehicle having an electric motor consistent with the present invention.

FIG. 4 is a control flow chart showing a regenerative braking method for the vehicle having the electric motor consistent with the present invention.

Referring to FIG. 4, in step S 100, the electronically controlled hydraulic brake device begins a control operation if a vehicle operator presses a pedal. In step S101, it is determined whether or not a regenerative braking operation is possible in the present situation with reference to information of the vehicle having the electric motor, the possibility of the regenerative braking operation, a change rate of signal from the brake pedal, wheel slip rate, etc.

If any emergency situation requiring a panic brake or ABS is determined based on the determined results of the step S101, in step S102, a regenerative braking operation is prohibited, and a CBS or ABS control is performed.

On the other hand, if it is determined that a regenerative braking operation is possible, the total amount of braking desired by a vehicle operator is calculated using a signal from the brake pedal BP, etc. in step S103.

The calculated total amount of braking desired by the vehicle operator is transmitted from the electronically controlled hydraulic brake device to the HCU in step S104, and the amount of regenerative braking is transmitted from the HCU to electronically controlled hydraulic brake device in step S105. Based on the amount of regenerative braking, the electronically controlled hydraulic brake device calculates the amount of braking needed after completion of the regenerative braking operation in step S106. In other words, the hydraulic brake device has to realize the amount of braking, which is needed after subtracting the amount of regenerative braking from the total amount of braking desired by the vehicle operator, and thus, has to calculate a brake hydraulic pressure to be applied to each wheel.

In step S107, it is determined whether the amount of regenerative braking increases or is kept constant by use of the electronically controlled hydraulic brake device. If the amount of regenerative braking increases or is kept constant, entrance valves of driving wheels are controlled using pressure information from the pressure sensors mounted to the respective vehicle wheels and master cylinder MC in step S108. The purpose of controlling the entrance valves of the driving wheels is to keep the pressure in the master cylinder MC at a level similar to that of a CBS and to maintain a target wheel pressure while fulfilling the amount of braking desired by the vehicle operator. In this case, the entrance valves of the driving wheels are controlled using the interrelationship between an entrance valve current and a pressure difference detected by the pressure sensors of the respective wheels and master cylinder MC. In this case, if the amount of regenerative braking decreases, the electronically controlled hydraulic brake device controls exit valves of the driving wheels to discharge a certain flow rate of brake liquid, so as to fulfill the target wheel pressure.

With the above described control operation, differently from a CBS, the master cylinder and wheels have a pressure difference. The pressure difference is caused by a regenerative braking torque. That is, in consideration of the fact that the vehicle having the electric motor generates an additional braking force by the regenerative braking operation, there is a need for subtracting a hydraulic braking force as much as a regenerative braking force.

The following description explains a control operation through steps S109, S110, S111, S112 and S114. First, the electronically controlled hydraulic brake device calculates a flow rate RB_F equal to the amount of regenerative braking by the HCU. The flow rate RB_F corresponds to a discharge amount of brake liquid Discharge_F that has to be discharged through the opened exit valves of non-driving wheels. To allow the brake liquid to be discharged through the exit valves of the non-driving wheels only during an initial stage of braking, a flag referred to as an Outlet_Terminal is defined. If the discharge amount Discharge_F is smaller than the flow rate RB_F, the flag keeps zero value, and the exit valves of the non-driving wheels have to be continuously opened. Then, if the discharge amount Discharge_F becomes equal to the flow rate RB_F as a result of continuous discharge of the brake liquid, the flag is set to the value of 1, and the exit valves of the non-driving wheels are closed so as not to discharge the brake liquid any more. The flag is continuously kept at the value of 1 until the braking is completed, and thus, the exit valves of the non-driving wheels are closed continuously. The above described control operation has to be performed only one time during the braking. If the Outlet_Terminal reaches the value of 1, and thus, the actual wheel pressure exceeds the target pressure, the exit valves of the driving wheels are operated to regulate the wheel pressure.

Meanwhile, if the electronically controlled hydraulic brake device determines a decrease in the amount of regenerative braking, in step S113, the wheel pressure has to be increased as much as the decreased amount of regenerative braking, to fulfill the total amount of braking desired by the vehicle operator. For this, a required amount of the brake liquid is pumped from the reservoir LRS by operation of the motor after the exit valves SUC2 and SUC4 are opened. In this case, the TC valves TC1 and TC2 are closed to separate the master cylinder MC from the wheel cylinders. Also, the entrance valves of the driving wheels are controlled to allow the wheel pressures of the driving wheels to reach the target wheel pressure. In this case, the entrance valves of the non-driving wheels are closed to prevent an increase in the wheel pressures of the non-driving wheels.

If the amount of regenerative braking completely disappears and each wheel pressure reaches the target pressure, the entire operation for controlling the regenerative braking is completed, and the regenerative braking mode is converted into a CBS mode.

As apparent from the above description, the present invention provides a regenerative braking operation for a vehicle having an electric motor, which can realize a vehicle operator's pedal feeling via control of entrance valves of driving wheels, and regulate a wheel pressure to a target pressure via control of exit valves of the driving wheels.

Further, during an initial stage of the regenerative braking operation related to the vehicle having the electric motor consistent with the present invention, a flow rate of brake liquid as much as the amount of regenerative braking is delivered into a reservoir through opened exit valves of non-driving wheels, so as to generate a hydraulic braking force needed after subtracting the amount of regenerative braking from the amount of braking desired by a vehicle operator. When the amount of regenerative braking increases, the exit valves of the driving wheels are controlled to fulfill the total amount of braking desired by the vehicle operator. Also, when the amount of regenerative braking decreases, the wheel pressures have to be increased to fulfill the vehicle operator's desire to brake.

Furthermore, when it is desired to increase a brake hydraulic pressure, opening/closing valves between an electronically controlled hydraulic brake device and the reservoir are opened and a motor is operated to enable direct pumping of the brake liquid from the reservoir, instead of using a brake liquid in a low accumulator.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A regenerative braking method for a vehicle having an electric motor comprising: the electric motor to convert a kinetic energy of the vehicle into an electric energy so as to brake the vehicle by regenerative braking; a reservoir to store brake oil therein; a master cylinder; normal open type entrance valves and normal close type exit valves provided at entrances and exits of respective wheel cylinders; a plurality of hydraulic pumps to pump the brake oil to the respective wheel cylinders; a motor to operate the plurality of hydraulic pumps; and opening/closing valves provided on hydraulic lines connecting the reservoir to suction sides of the respective hydraulic pumps, the regenerative braking method generating a residual amount of braking needed after subtracting the amount of regenerative braking, which corresponds to an amount generated by the electric motor, from a vehicle operator's desired braking amount, wherein, during a regenerative braking operation, based on a pressure difference between a pressure in the master cylinder and wheel pressures, the entrance valves of driving wheels are controlled to realize an operator's pedal feeling, and the exit valves of the driving wheels are controlled to allow the wheel pressures to follow a target pressure.

2. The method according to claim 1, wherein:

during an initial stage of the regenerative braking operation, a flow rate of the brake oil corresponding to the amount of regenerative braking by the electric motor is discharged to the outside through the opened exit valves of non-driving wheels;

when the amount of regenerative braking increases, the exit valves of the driving wheels are controlled to fulfill the total amount of braking desired by a vehicle operator; and when the amount of regenerative braking decreases, the wheel pressures are increased to fulfill the vehicle operator's desire to brake.

3. The method according to claim 2, wherein, to raise a brake hydraulic pressure, the opening/closing valves provided on the hydraulic lines between the reservoir and the hydraulic pumps are opened and the motor is operated, to enable direct pumping of a required flow rate of the brake oil from the reservoir.

* * * * *